United States Patent Office 2,697,490
Patented Dec. 21, 1954

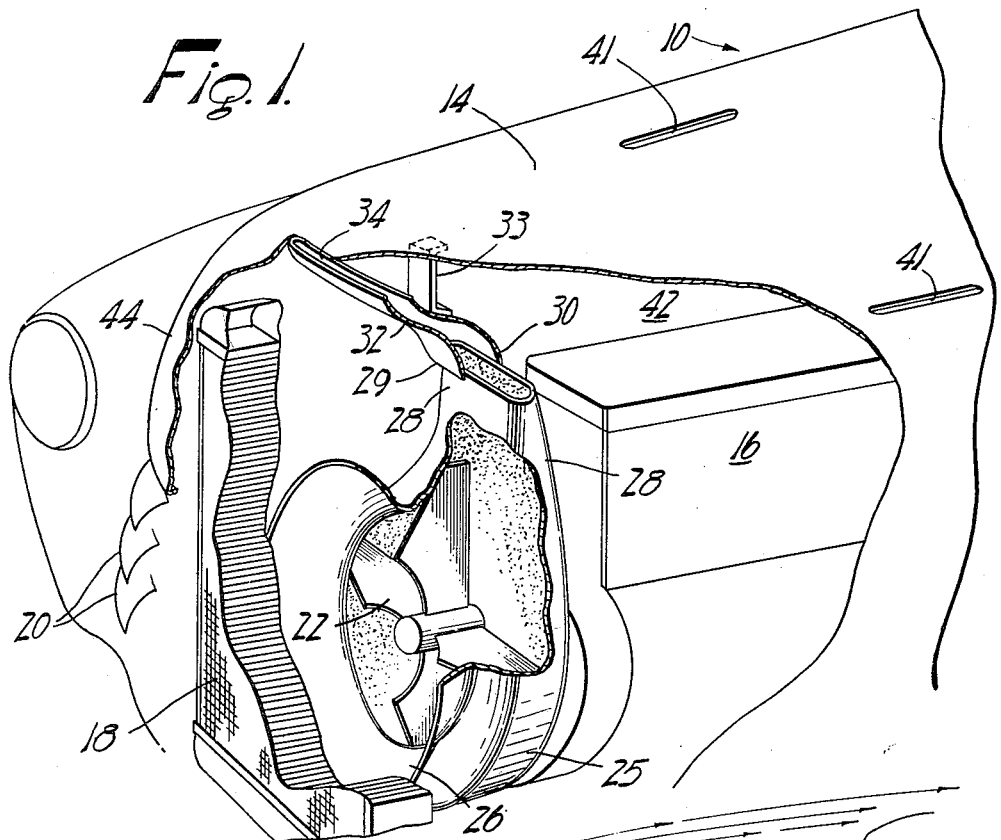
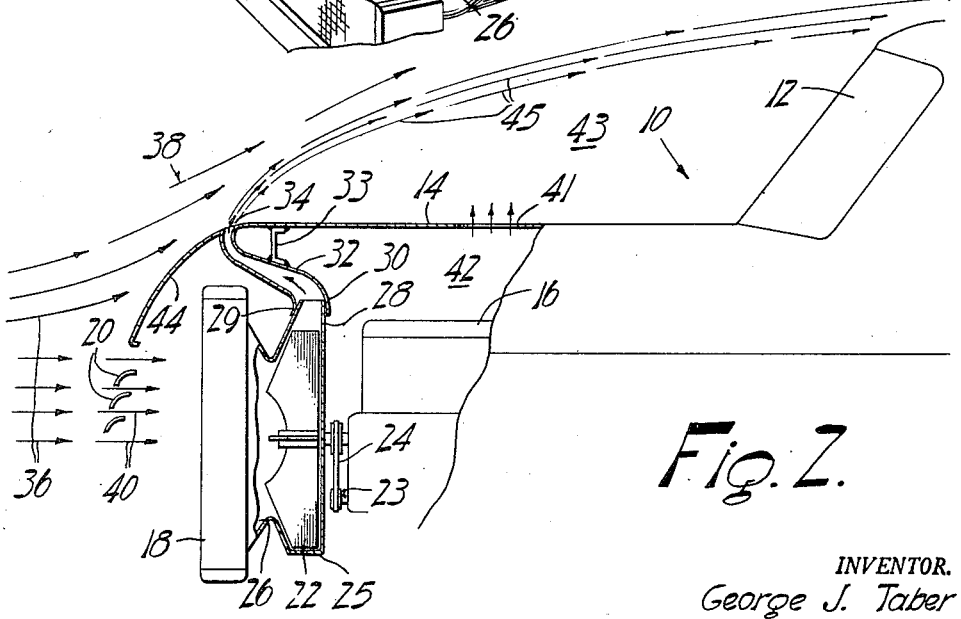

2,697,490

VEHICLE AIR STREAM CONTROL MEANS

George J. Taber, Buffalo, N. Y.

Application September 14, 1950, Serial No. 184,839

3 Claims. (Cl. 180—1)

This invention relates to motor vehicles and to means for maintaining the windshields thereof free from vision obscuring matter.

Whereas, means have been proposed for deflecting airstream carried insects, rain, snow, dirt, and the like from the windshields of vehicles, such prior arrangements have been deficient in that they have involved unsightly, and vision obscuring external attachments and has lacked sufficient force and proper aerodynamic locationing to fully achieve their purpose. Also, such prior arrangements have failed to make most effective use of existing automobile elements such as the sloping front of the automobile hood and the radiator fan so as to achieve maximum efficiency in cooperation with such elements of the vehicle.

Therefore, one object of the invention is to provide an improved aerodynamic slipstream deflector adapted to divert from the vehicle windshield the normal airstream and the vision obscuring matter carried therein which normally deposits upon the windshield of a vehicle during forward motion thereof.

Another object of the invention is to provide an aerodynamic windscreen as aforesaid which will be effective over a wider range of vehicle speeds compared to previous devices.

Another object of the invention is to provide an airstream deflector arrangement for vehicles as aforesaid wherein the structural parts thereof are wholly contained within the normal outline of the vehicle so as not to affect the appearance or safety of operation thereof and avoids use of undesirable external accessories.

Still another object of the invention is to provide an improved airstream deflector for vehicles which will utilize the discharge blast from the radiator fan and which will divert that blast from the engine in improved manner so as to protect the latter from rain, dirt, and the like.

Other objects and advantages of the invention will appear from the specification hereinafter.

In the drawings:

Fig. 1 is a perspective view, partly broken away, of the front end of a motor vehicle equipped in accordance with the present invention; and Fig. 2 is a transverse section of the vehicle of Fig. 1 showing the aerodynamic functioning thereof.

In the drawing, one form of the invention is illustrated as being embodied in a motor vehicle 10 having a windshield 12 and a hood 14, which extends forwardly from the base of the windishield to the front end of the vehicle. As is customary, the hood 14 houses the vehicle power plant which includes a water-cooled engine 16 and a cooling water radiator 18 to which air is admitted through a grill 20 in the front of the vehicle. In accordance with the invention, a dual purpose fan 22 is located between the radiator 18 and the engine 16 and is connected to the latter to be driven therefrom by suitable connection to the front end of the engine crank shaft 23, as by means of a fan belt 24 (Fig. 2). It will be understood of course that the fan 22 may be driven by other means, as for example, an electric motor, according to convenience in design or other considerations in various applications of the invention.

The fan 22 is fitted with a fan casing or shroud 25 having an intake opening 26 located at the rear surface of the radiator 18 to receive air after it has been passed through the latter for water cooling purposes. The outlet 28 of the fan shroud is directed upwardly from the fan periphery in front of the engine 16 and slip-fits at 29 into the cooperating stem 30 of a nozzle member 32.

The nozzle member 32 is supported from the hood 14 by a bracket 33, and the slip-fit joint 29 permits it to separate from the outlet 28 and move with the hood 14 whenever the latter is lifted for engine servicing operation. As is shown in the drawing, the nozzle member goosenecks forwardly and terminates in a transverse slot 34 which extends through the forward corner portion of the hood 14 and terminates flush therewith, thus providing an unobtrusive orifice for the issuance of the fan blast as will be more fully described hereinafter.

The fan 22 illustrated is of the centrifugal type, and this type is preferred in this embodiment of the invention because it is adapted to peripheral discharge of the fan blast, thereby facilitating close nesting of the fan to the engine 16. However, it will be appreciated that an axial flow type fan such as is generally used in automobiles for drawing the air through the cooling water radiators could be used in lieu of the centrifugal fan shown; and in such event it would be preferable that suitable alterations in the shape of the shroud be made in order to permit air flow through the fan and to then collect and direct the fan exhaust upwardly into a nozzle or jet member similar to nozzle member 32. Similarly, any other type of fan could be adapted to suck or force air through the radiator and then, by means of a closed conduit system, collect and direct the exhaust air upwardly into a jet or nozzle member at the forward top corner portion of the hood. Furthermore, it will be appreciated that the invention is not limited to the use of the radiator fan or to the specific location of such a fan, the arrangement shown being however a preferred means of obtaining a forceful air jet for use in effecting the aerodynamic results desired while providing maximum cooperation with the usual elements of the motor vehicle while requiring minimum dislocation thereof.

Referring to Fig. 2, it will be seen that as the motor vehicle 10 is operated in a forward direction the relatively on-coming airstream 36 divides in an area shortly ahead of the vehicle, a major or slipstream portion 38 being forced upwardly and over the hood 14, while a smaller or lower portion 40 enters the grill 20 and is drawn through the radiator 18 by the fan 22 as the latter is rotated by the engine 16. The lower airstream 40 is thereupon collected by the shroud 25 and is directed through the outlet 28 thereof upwardly through the nozzle member 32 to the orifice 34 where it is forcefully ejected substantially vertically into the oncoming slipstream 38 thereby deflecting the latter further upwardly from the hood 14 and over the top of the vehicle so as to clear the windshield 12. It will be obvious that insects dirt, rain, and the like, such as may be entrained in the oncoming airstream 36 will thereby be deflected to a course above the windshield 12 so as not to impinge upon the same and will instead pass harmlessly over the vehicle. Additionally, a pair of vents 41—41 may be provided in the hood 14 between the orifice 34 and windshield 12 to communicate between the engine compartment 42 and the dead air space 43 above the hood to relieve such partial vacuum in the dead air space 43 as might result from the upward diversion of the slipstream 38 and might tend to impede the free flow of the diverted air, depending upon the shape of the vehicle body.

It is to be especially noted that the airstream diverting nozzle or orifice 34 is located well ahead of the windshield so that no part of its blast flows over or impinges upon the windshield. Furthermore, the locationing of the nozzle 34 is such that advantage is taken of the partial upward change in direction of the slipstream 38 already effected by the oncoming nose portion 44 of the vehicle. Thus, it will be seen that the control stream 45 emerging from the nozzle 34 in effect provides an invisible upward continuation of the nose portion 44 whereby the slipstream 38 is diverted in a continuous unbroken upward sweep without turbulence and loss of momentum such as would result if the slot 34 were located further to the rear so as to permit the slipstream 38 to lose its initial upward surge.

A particular feature and advantage of the invention resides in the fact that the air diverting jet is powered from the vehicle engine and is not dependent on rapid forward movement of the car. Hence, the air deflector of the invention is operative at moderate speeds as well as at highway speeds, thereby providing windshield protection under practically all operating conditions. A corollary advantage of the invention results from the fact that in addition to putting the exhaust airstream from the radiator fan to a useful air deflecting purpose, the fan shroud 25 also protects the engine 16 from dirt and water such as may be entrained in the fan exhaust and might otherwise be deposited in the engine parts.

Thus, the invention contemplates the provision of one or more upwardly directed jets from a concealed source at the forward end portion of the vehicle, well ahead of the windshield; and preferably the air jet or jets is arranged to supplement and form a continuation of the upwardly flowing airstream as deflected by the front end portion of the vehicle. The invention also contemplates the provision of vacuum relieving vents between the slipstream deflecting jet and the windshield where needed, and teaches use of the vehicle radiator fan in improved manner as the jet power source.

I claim:

1. In a motor vehicle, a windshield, an engine hood disposed forwardly of and below said windshield, a radiator disposed beneath said hood near the forward end thereof, an engine disposed beneath said hood rearwardly of said radiator, a radiator fan disposed between said radiator and said engine, a shroud surrounding said fan and having an inlet facing said radiator and an outlet directed upwardly, a nozzle member connected to said outlet and opening through said hood, and vent holes piercing said hood between said nozzle and said windshield.

2. In a motor vehicle, a windshield, a hood located in front of and below said windshield, a radiator fan disposed beneath said hood in the forward portion thereof, fan exhaust duct means embracing said fan at the discharge portion thereof and having an outlet directed toward said hood, nozzle means connecting with said outlet and opening through the forward portion of said hood and transversely thereof, and vent means opening through said hood between said nozzle means and said windshield.

3. In a motor vehicle, a windshield, a body member extending in front of and below said windshield, air jet means including air velocity generating means and conduit means communicating therewith carried generally beneath said body member, said conduit means terminating in orifice means directed upwardly through the forward top portion of said body member and into the path of the aerodynamic slipstream of the vehicle, and vent means piercing the top of said body member between said orifice means and said windshield.

References Cited in the file of this patent

UNITED STATES PATENTS

| Number | Name | Date |
|---|---|---|
| 1,334,811 | Smith | Mar. 23, 1920 |
| 1,610,917 | Baumgartner | Dec. 14, 1926 |
| 2,022,833 | Welch | Dec. 3, 1935 |
| 2,133,927 | Riel | Oct. 18, 1938 |
| 2,223,378 | Martin | Dec. 3, 1940 |
| 2,229,516 | Metzger | Jan. 21, 1941 |

FOREIGN PATENTS

| Number | Country | Date |
|---|---|---|
| 552,153 | Great Britain | Mar. 25, 1943 |